UNITED STATES PATENT OFFICE.

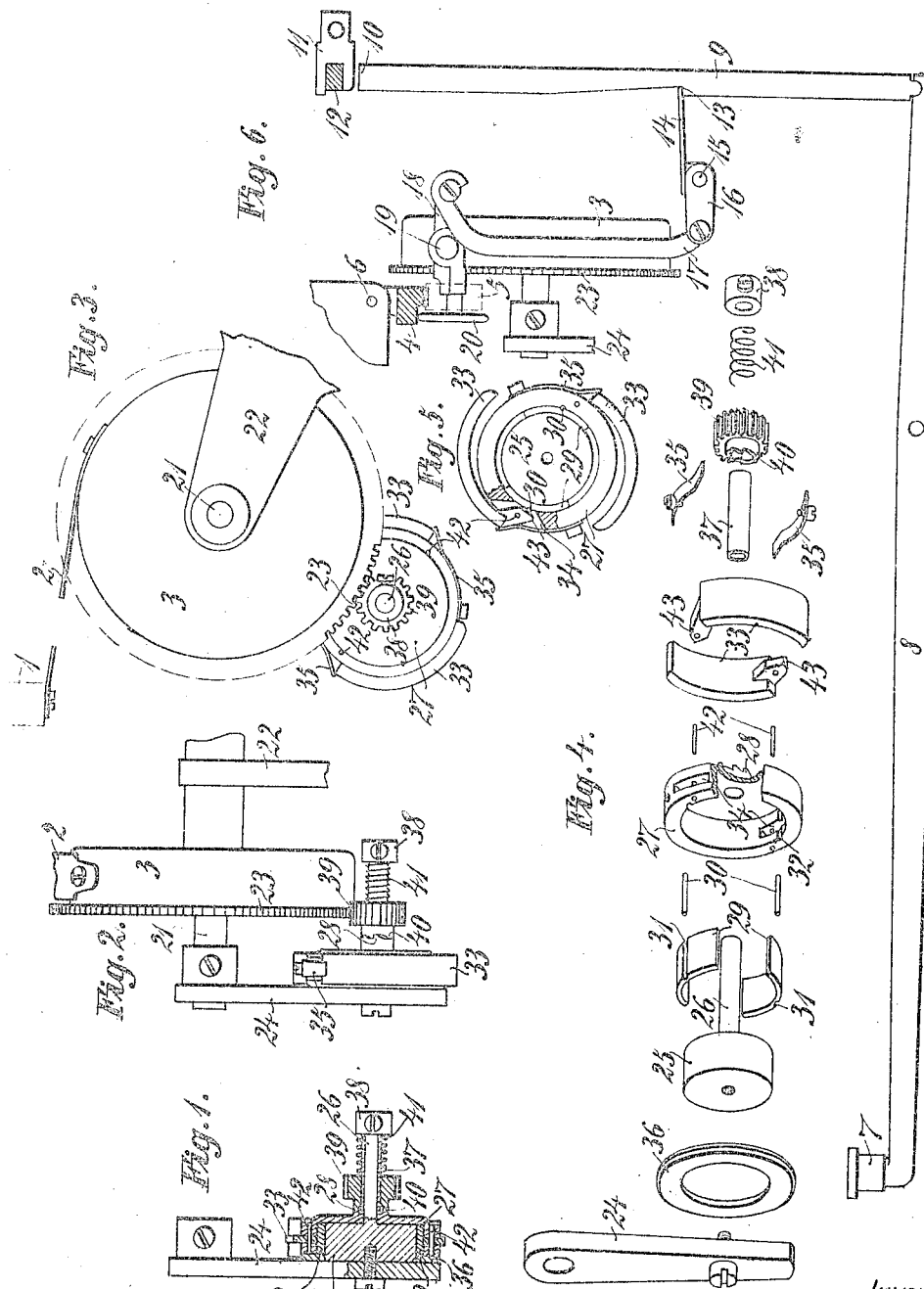

EMIL L. PFUNDER, OF HARTFORD, CONNECTICUT, ASSIGNOR TO UNDERWOOD TYPE-WRITER COMPANY, OF NEW YORK, N. Y., A CORPORATION OF NEW JERSEY.

TYPE-WRITING MACHINE.

972,022.   Specification of Letters Patent.   Patented Oct. 4, 1910.

Application filed October 26, 1908. Serial No. 459,489.

*To all whom it may concern:*

Be it known that I, EMIL L. PFUNDER, a citizen of the United States, residing in Hartford, in the county of Hartford and State of Connecticut, have invented certain new and useful Improvements in Type-Writing Machines, of which the following is a specification.

This invention relates to typewriting and tabulating machines, and particularly to means for controlling the speed of the carriage when it is released from its letter-feeding devices.

The invention is in the nature of an improvement upon the device shown in my pending application No. 452,300, in which a centrifugally operated braking device is illustrated connected with the carriage of a typewriting machine, but is operated only when the carriage moves in letter-feeding direction.

The object of the invention is to provide an improved, simplified and inexpensive braking device.

I provide a fixed friction cylinder or device and a rotatable governor head in the form of an annular casing to inclose said friction cylinder. Between the head and cylinder are loosely confined brake shoes, in the form of segments of a ring; and weighted levers are carried upon opposite sides of the head to bear upon the shoes to force them against the periphery of the cylinder.

In the accompanying drawings, Figure 1 is a sectional side elevation of the braking mechanism. Fig. 2 is a side elevation of the braking mechanism shown in connection with the carriage-driving barrel. Fig. 3 is a rear elevation of the parts shown in Fig. 2. Fig. 4 is a perspective view of the component parts of the braking mechanism. Fig. 5 is an end elevation, partly in section, of the friction device and rotatable head with appurtenances, illustrating the manner of forcing the brake shoes against the friction device. Fig. 6 is a diagrammatic elevation of the tabulating mechanism, including the denomination stop key and means to release the carriage from the control of its letter-feeding devices.

A paper carriage 1 is connected by a strap 2 to a spring barrel 3. Upon the carriage is a rack 4 to engage a pinion 5, forming part of an escapement mechanism to control the letter-feeding movements of the carriage. The rack is hinged at 6 upon the carriage, to be released from said pinion to permit the carriage to advance rapidly.

A denomination or tabulator key 7 is mounted upon a lever 8, which thrusts upward a rod 9, having at its upper end a stop 10 to coöperate with a column stop 11, which is mounted upon a rack bar 12 fixed upon the framework. The rod 9 is formed with a shoulder 13 to engage a universal bar 14, which projects from a rock-shaft 15; said rock-shaft also carrying a forwardly extending arm 16, which is connected by a link 17 to a lever 18 pivoted at 19 upon the framework and carrying a roll 20 to release the rack 4 from the pinion 5 when the key 7 is depressed.

As so far described, the parts are in common use upon the Underwood typewriting machine.

The spring barrel 3, journaled upon a stud 21 on the framework 22, is provided with a gear 23. Secured to a bracket 24 (supported by a projecting end of the stud 21) is a cylindrical friction device 25. From the latter projects a stem or stud 26. A governor head, in the form of an annular casing 27, is rotatably mounted on the stem 26 to inclose the friction cylinder 25. Said casing carries a ratchet or clutch member 28 at its outer end.

Inserted between the periphery of the friction cylinder 25 and the casing 27 are brake shoes 29, in the form of segments of a ring. Bearing pins or rollers 30 engage complementary grooves or recesses 31, 32 in the brake shoes and the casing respectively, to rotate the shoes with the casing. Weighted lever arms 33 are pivotally secured in opposite slots 34 in the casing, said arms curving around the casing close thereto. Springs 35 tend to retain the arms in normal closed positions.

A washer 36 is mounted on the cylinder 25 between the bracket 24 and the end of the casing 27, to close the space between the periphery of the cylinder and the casing and prevent displacement of the brake shoes 29.

A sleeve or bushing 37 is mounted on the stem 26, one end abutting against the casing 27, and the other end engaged by a collar 38 secured to the stem 26 by a set screw, to prevent displacement of the braking device.

A pinion 39, mounted to turn on sleeve 37, is permanently in mesh with the gear 23 on the spring barrel 3, and is provided with a ratchet or clutch member 40, to co-act with the ratchet 28 on the casing 27. A compression spring 41 between the pinion 37 and the collar 38 tends to couple the ratchets.

During the letter-feeding movements of the carriage, the braking mechanism has little or no effect, since such movements are very short; but when the carriage is released from its letter feeding devices by the tabulator key 7, or otherwise, and a rapid movement imparted to the spring barrel 3, the pinion 39 revolves the casing 27 at a high velocity about the fixed cylinder 25, carrying with it the brake shoes 29. The weighted lever arms 33 fly outwardly, (Fig. 5) rocking said arms on their pivots 42 and causing cam shoulders 43 on said arms to bear against the pins or rollers 30, to force the brake shoes against the fixed cylinder 25, to retard the rotation of the pinion 39, and hence of the spring barrel 3, thereby reducing or controlling the speed of the carriage 1. When the carriage is returned to begin a new line, the teeth of the ratchet or clutch member 40 on the pinion 39 ride idly over the teeth of the co-acting ratchet or clutch member 28 on the casing 27.

Having thus described my invention, I claim:

1. The combination of a fixed cylinder, a revoluble case fitting over said cylinder, and a pair of arms carried upon opposite sides of said case to bear upon said shoes contained in said case, to press said shoes against the periphery of said cylinder, said shoes in the form of segments of a ring and loosely confined between the case and the cylinder and having between their ends grooves to receive bearing-pins or rollers against which said arms press.

2. The combination of a cylinder, a head having shoes to bear on the periphery of said cylinder, weighted levers pivoted upon said head to press said shoes against said periphery, a pinion connected to said head to revolve the same, and a carriage-driving spring barrel having a gear meshing with said pinion, the cylinder fixed upon a bracket arm extending from an axle on which said spring barrel turns.

3. In a braking device to reduce or control the speed of the carriage of a typewriter, comprising a fixed friction device having a stem, a rotatable annular casing inclosing the friction device and provided with a ratchet, brake shoes carried within said casing to engage the friction device, weighted arms pivoted in the annular wall of the casing and provided with fingers to engage the brake shoes, said arms curving around said casing close thereto, springs for said arms, and a pinion connected with the carriage.

4. A rotary braking device connected to the carriage of a typewriter, comprising a fixed friction device having a stem, a head rotatably mounted on said stem to surround the friction device and provided with a ratchet, brake shoes carried by the head to engage the friction device, weighted arms pivoted in slots in said head, said arms curving around the head close thereto, and provided with fingers to engage the brake shoes, and a pinion connected with the carriage and also provided with a ratchet; said weighted arms being thrown outwardly by centrifugal force when the casing is rotated, rocking said arms and causing them to impinge upon the brake shoes to force them against the friction device.

5. A rotary braking device comprising a cylindrical friction device having a stem, an annular casing rotatably mounted on said stem to inclose the friction device, brake shoes within the casing to engage the friction device, and levers pivoted on the casing, each lever comprising a weighted arm curving around the casing, and also provided with a shoulder to engage a brake shoe.

6. A rotary braking device connected to the spring barrel of a typewriter, comprising a cylindrical friction device having a stem and fixed to a bracket secured to a barrel-supporting stud, an annular casing rotatably mounted on said stem to inclose the friction device, brake shoes within the casing to engage the friction device, levers pivoted on the casing, each lever comprising a weighted arm curving around the casing, and also provided with a shoulder to engage a brake shoe, a pinion connected to the spring barrel, and a clutch between the pinion and the casing.

7. A braking device comprising a friction device having a stem, a rotatable head mounted on the stem to surround the friction device, a pair of brake shoes in the form of segments of a ring loosely confined between the casing and the friction device, a washer to prevent displacement of the shoes, a pair of weighted arms pivoted in said head and having shoulders to engage the shoes, and springs for said arms.

8. A braking mechanism comprising a fixed cylinder, a rotatable annular casing inclosing said cylinder and provided with opposite recesses, shoes loosely confined by the casing and cylinder, said shoes provided with complementary grooves or recesses bearing pins to engage the recesses in the casing and shoes, and centrifugal arms pivoted on the casing to engage the bearing pins to press the shoes against the cylinder.

EMIL L. PFUNDER.

Witnesses:
W. M. BYORKMAN,
LYMAN D. BROUGHTON.